(12) United States Patent
Ishii (10) Patent No.: US 7,954,585 B2
(45) Date of Patent: Jun. 7, 2011

(54) SWING-ARM-TYPE SUSPENSION DEVICE OF VEHICLE

(75) Inventor: Takanori Ishii, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 711 days.

(21) Appl. No.: 11/378,246

(22) Filed: Mar. 20, 2006

(65) Prior Publication Data

US 2007/0102218 A1   May 10, 2007

(30) Foreign Application Priority Data

Mar. 23, 2005 (JP) ................................. 2005-083982

(51) Int. Cl.
*B62M 7/00* (2010.01)
(52) U.S. Cl. ....................... 180/227; 280/283; 280/285
(58) Field of Classification Search .................. 180/227; 280/283, 285
See application file for complete search history.

(56) References Cited

U.S. PATENT DOCUMENTS

| 3,171,642 A * | 3/1965 | Allison ........................ 267/240 |
| 4,523,659 A * | 6/1985 | Yamamoto et al. ............ 180/227 |
| 2002/0027035 A1 * | 3/2002 | Gogo ............................ 180/227 |

FOREIGN PATENT DOCUMENTS

| JP | 38-12215 B | 7/1963 |
| JP | 05-178267 A | 7/1993 |
| JP | 6-3792 U | 1/1994 |
| JP | 2002-068066 A | 3/2002 |
| JP | 2003-341580 A | 12/2003 |

* cited by examiner

*Primary Examiner* — Joanne Silbermann
*Assistant Examiner* — Jacob Knutson
(74) *Attorney, Agent, or Firm* — Birch, Stewart, Kolasch & Birch, LLP (57) ABSTRACT

A swing-arm-type suspension device for a vehicle transmit rolling from a vehicle body frame side to a rear wheel side quickly. In a swing-arm-type suspension device for a motorcycle, a swing arm is mounted swingably on a pivot shaft provided on a vehicle body frame side, to be more specific, a power unit. One end of a cushion unit is mounted on the swing arm. Another end of the cushion unit is mounted on the swing arm and the power unit by way of a cushion support link mechanism. A rear wheel is supported on an end portion of the swing arm, between a cross pipe that extends between left and right seat rails and the swing arm. A rolling support link mechanism transmits rolling of a vehicle body in the lateral direction to the swing arm from the seat rails on the vehicle-body-frame side.

18 Claims, 8 Drawing Sheets

SWING-ARM-TYPE SUSPENSION DEVICE OF VEHICLE

CROSS-REFERENCE TO RELATED APPLICATIONS

This nonprovisional application claims priority under 35 U.S.C. §119(a) on Patent Application No. 2005-083982, filed in Japan on Mar. 23, 2005, the entirety of which is incorporated herein by reference.

BACKGROUND OF THE INVENTION

1. Field of the Invention

The present invention relates to a swing-arm-type suspension device for a vehicle.

2. Description of Background Art

A swing-arm-type suspension device for a vehicle is known in the background art. Specifically, one end of a swing arm is mounted on a vehicle-body-side pivot shaft. A rear wheel is supported on another end of the swing arm. An upper end of a cushion unit (shock absorber) is mounted on the swing arm. Furthermore, a lower end of the cushion unit is connected to the vehicle-body side and the swing-arm side by way of a link mechanism (see, for example, Japanese Patent Application Laid-Open No. 2002-68066).

Figure 1:
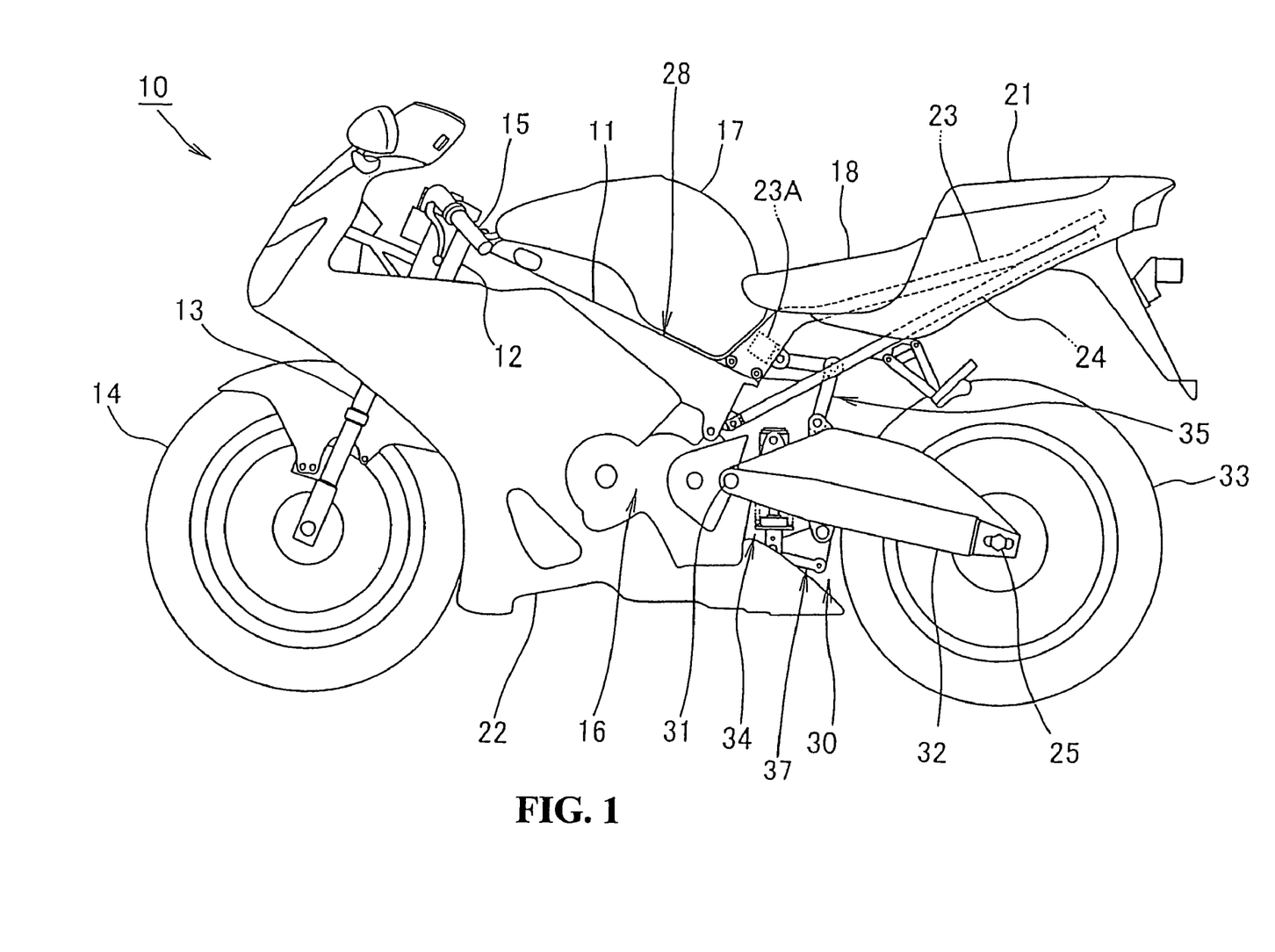
FIG. 1 is a side view of a vehicle provided with a swing-arm-type suspension device according to the present invention (first embodiment)
Figure 2:
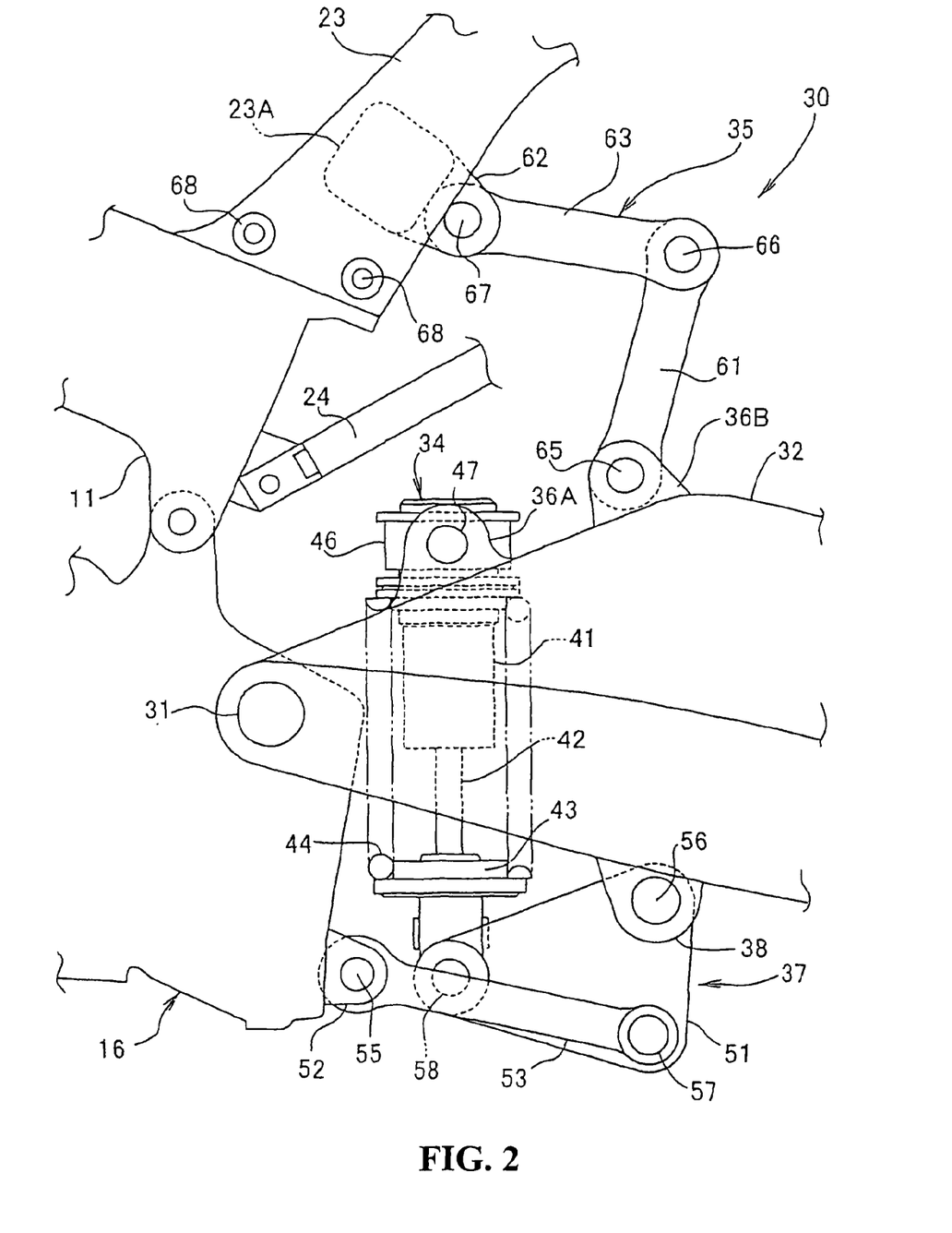
FIG. 2 is a side view showing an essential part of a swing-arm-type suspension device according to the present invention (first embodiment)

In FIGS. 1 and 2 of the above document, a swing-arm-type suspension device 30 having the following structure is described. Specifically, a pivot shaft 31 is mounted on a rear portion of a power unit 16. A front end of a swing arm 32 is swingably mounted on the pivot shaft 31. A rear wheel 33 is mounted on a rear end of the swing arm 32. An upper end mounting portion 46, which is mounted on an end portion of a cushion unit 34 is swingably mounted on an upper bracket 36 of the swing arm 32. A lower end mounting portion 43, which is mounted on an end portion of the cushion unit 34 and a lower portion bracket 38 of the swing arm 32 are connected to a link mechanism 37. Furthermore, the link mechanism 37 is connected to a rear lower portion of the power unit 16.

When a vehicle body starts rolling during cornering or the like, the rolling of the power unit 16 on the vehicle body side is transmitted to the swing arm 32 by way of the pivotal shaft 31. The rolling motion is then transmitted to the rear wheel 33 from the swing arm 32. However, the rolling of the vehicle body is transmitted to the rear wheel 33 with a delay following the rolling of the power unit 16. Depending on the rider, there exists a demand for a swing-arm-type suspension device for a rear wheel that can transmit the rolling of the vehicle body to the rear wheel 33 substantially with no delay.

SUMMARY OF THE INVENTION

It is an object of the present invention to provide a swing-arm-type suspension device for a vehicle that transmits rolling from a vehicle-body-frame side to a rear-wheel side more rapidly.

According to a first aspect of the present invention, in a swing-arm-type suspension device for a vehicle, a swing arm is mounted swingably on a pivot shaft provided to a vehicle body frame side. One end of a cushion unit is mounted on the swing arm. Another end of the cushion unit is mounted on the swing arm and the vehicle body frame by way of a cushion support link mechanism. A rear wheel is supported on an end portion of the swing arm. A rolling support link mechanism that transmits rolling in the lateral direction of a vehicle body about ground contacting portions of a front wheel and the rear wheel to the swing arm from the vehicle body frame is provided between the vehicle body frame and the swing arm.

When the vehicle body frame rolls, the rolling is transmitted to the swing arm by way of the pivot shaft. At the same time, the rolling of the vehicle body frame is also transmitted to the swing arm by way of the rolling support link mechanism. With the rolling support link mechanism according to the first aspect of the present invention, it is possible to transmit rolling of the vehicle body frame to the rear wheel more rapidly.

According to as second aspect of the present invention, the rolling support link mechanism has one end thereof connected to an upper portion of the swing arm.

The upper portion of the swing arm is arranged at a position where the upper portion of the swing arm can be easily arranged close to the vehicle body frame. Therefore, by connecting the upper portion of the swing arm and the vehicle body frame to each other using the rolling support link mechanism, it is possible to shorten the lengths of the respective links that constitute the rolling support link mechanism.

According to a third aspect of the present invention, the rolling support link mechanism has a swing-arm-side connecting portion thereof arranged behind the cushion unit.

The swing-arm-side connecting portion of the rolling support link mechanism is arranged closer to the rear wheel, which is supported by an end portion of the swing arm. Therefore, the rolling of the vehicle body frame is transmitted more rapidly to the rear wheel by way of the rolling support link mechanism.

In the first aspect of the present invention, the rolling support link mechanism is provided between the vehicle body frame and the swing arm. Therefore, in addition to the transmission of rolling of the vehicle body to the swing arm from the vehicle body frame side by way of the pivot shaft, it is possible to transmit rolling of the vehicle body to the swing arm from the vehicle body frame side by way of the support link device. In view of this, it is possible to transmit rolling to the rear wheel rapidly.

According to the second aspect of the present invention, the rolling support link mechanism has one end thereof connected to the upper portion of the swing arm. Therefore, it is possible to further shorten the lengths of the respective links of the rolling support link mechanism. In view of this, the rolling of the vehicle-body-frame can be transmitted to the rear wheel more rapidly.

According to the third aspect of the present invention, the rolling support link mechanism has the swing-arm-side connecting portion thereof arranged behind the cushion unit. Therefore, it is possible to arrange the swing-arm-side connecting portion of the rolling support link mechanism closer to the rear wheel. Accordingly, it is possible to efficiently transmit the rolling of the vehicle body frame to the rear wheel. Therefore, the responsiveness of the rolling of the rear wheel relative to the rolling of the vehicle-body-frame side can be enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will now be described with reference to the accompanying drawings, wherein the same or similar elements will be identified with the same reference numerals. It should be noted that the drawings should be viewed in conformance with the orientation of the reference numerals thereon.

FIG. 1 is a side view of a vehicle that is provided with a swing-arm-type suspension device according to the present invention (first embodiment). A motorcycle 10 is the vehicle in which a front fork 13 and a front wheel 14 are steerably mounted on a main frame 11. A head pipe 12 is formed on a front end portion of the main frame 11. A handle bar 15 is mounted on an upper portion of the front fork 13. A power unit 16 that includes an engine and a transmission is mounted on a lower portion of the main frame 11. A swing-arm-type suspension device 30 is mounted on a rear portion of the power unit 16. A fuel tank 17 is mounted on an upper portion of the main frame 11. Furthermore, seats 18, 21 are arranged behind the fuel tank 17. Reference numeral 22 identifies a cowling. Reference numerals 23, 24 identify seat rails and sub frames, respectively, which extend in the oblique rearward and upward direction from a rear portion of the main frame 11. Furthermore, reference numeral 25 identifies a rear wheel axle.

In the swing-arm-type suspension device 30, a pivot shaft 31 is mounted on a rear portion of the power unit 16. A front end of a swing arm 32 is swingably mounted on the pivot shaft 31. A rear wheel 33 is mounted on a rear end of the swing arm 32. An upper end of a cushion unit 34 absorbs impact so as to prevent the transmission of an impact to a vehicle body by way of the rear wheel 33 and the swing arm 32. The upper end of the cushion unit 34 is arranged in the vicinity of the pivot shaft 31 of the swing arm 32. A lower end of the cushion unit 34 is mounted on a lower portion of the power unit 16 and the swing arm 32 by way of a cushion support link mechanism 37 (described later in detail). An upper portion of the swing arm 32 and a cross pipe 23A, which extends between left and right seat rails 23, are connected with each other by a rolling support link mechanism 35.

The above-mentioned main frame 11, seat rails 23, cross pipe 23A and sub frame 24 are included in the vehicle body frame 28.

FIG. 2 is a side view showing an essential part of the swing-arm-type suspension device according to the present invention (first embodiment), wherein the swing arm 32 forms an upper first bracket 36A for mounting the cushion unit 34 and an upper second bracket 36B for mounting the rolling support link mechanism 35 on an upper portion thereof. Furthermore, the swing arm 32 forms a lower bracket 38 for mounting the cushion support link mechanism 37 on a lower portion thereof.

The cushion unit 34 includes a cylinder portion 41. A piston rod 42 is mounted on a piston (not shown in the drawing) that is movably housed in the cylinder portion 41. A lower-end mounting portion 43 is formed on an end portion of the piston rod 42. A suspension spring 44 is interposed between the cylinder portion 41 and the lower-end mounting portion 43. Furthermore, an upper-end mounting portion 46, which is formed on an end portion of the cylinder portion 41, is swingably mounted on the upper first bracket 36A of the swing arm 32. The lower-end mounting portion 43 is mounted on the cushion support link mechanism 37. Reference numeral 47 identifies an upper swing shaft that connects the upper mounting portion 46 to the upper first bracket 36A.

The cushion support link mechanism 37 includes a first link 51 having a triangular shape as viewed from the side. The first link 51 is swingably mounted on a lower bracket 38 of the swing arm 32. A second link 53 has one end swingably mounted on the first link 51 and another end thereof swingably mounted on a link mounting portion 52 that is formed on a lower portion of the power unit 16. Reference numeral 55 identifies a power-unit-side swing shaft that connects the second link 53 to the link mounting portion 52. The power-unit-side swing shaft 55 constitutes a shaft that is positioned below the pivot shaft 31.

The first link 51 is connected with the lower bracket 38 of the swing arm 32 using a first shaft 56. The first link 51 is also connected with the second link 53 using a second shaft 57. Furthermore, the first link 51 is swingably connected with the lower-end mounting portion 43 of the cushion unit 34 using a third shaft 58.

The rolling support link mechanism 35 includes a first support link 61 that has one end thereof swingably mounted on the upper second bracket 36B of the swing arm 32. A second support link 63 has one end thereof swingably mounted on another end of the first support link 61. Another end of the second support link 63 is swingably mounted on a frame-side bracket 62 that is mounted on the cross pipe 23A on the seat rail 23 side.

Reference numeral 65 identifies a first connection shaft that connects the upper second bracket 36B and the first support link 61. Reference numeral 66 identifies a second connection shaft that connects the first support link 61 and the second support link 63. Reference numeral 67 identifies a third connection shaft that connects the second support link 63 and the frame-side bracket 62. Furthermore, reference numeral 68 identifies a mounting bolt that mounts the seat rail 23 on the main frame 11.

Figure 3:
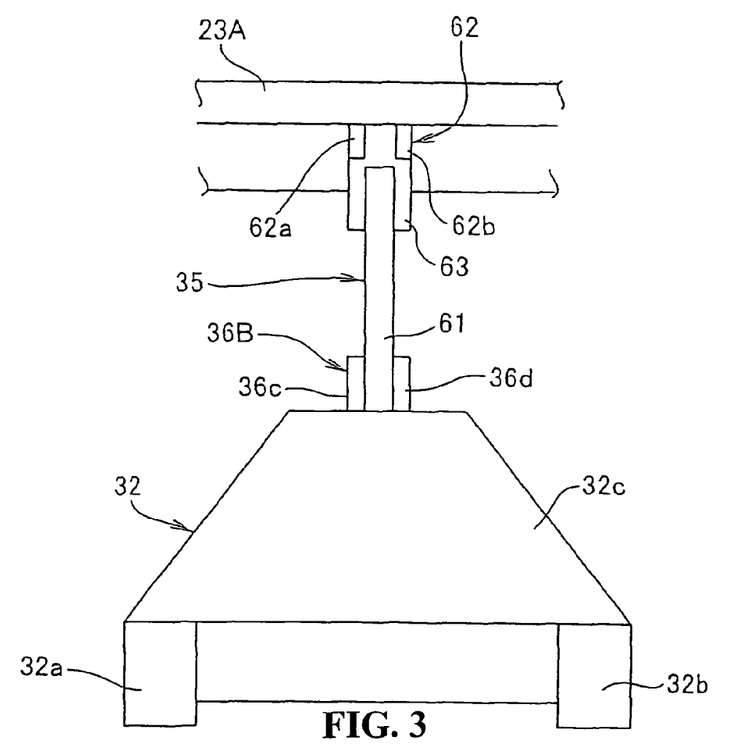
FIG. 3 is a back view for explaining a rolling support link mechanism according to the present invention (first embodiment)

FIG. 3 is a back view for explaining the rolling support link mechanism according to the present invention (first embodiment). FIG. 3 shows a state in which the rolling support link mechanism 35 extends between the frame-side bracket 62 that is mounted on the seat-rail-side cross pipe 23A and the swing arm 32. To be more specific, the upper second bracket 36B that is formed on an upper portion of the connection portion 32c, which connects the laterally arranged left section 32a and a right section 32b. The upper second bracket 36B includes a left bracket 36c and a right bracket 36d. The frame-side bracket 62 includes a left bracket 62a and a right bracket 62b.

Figure 4:
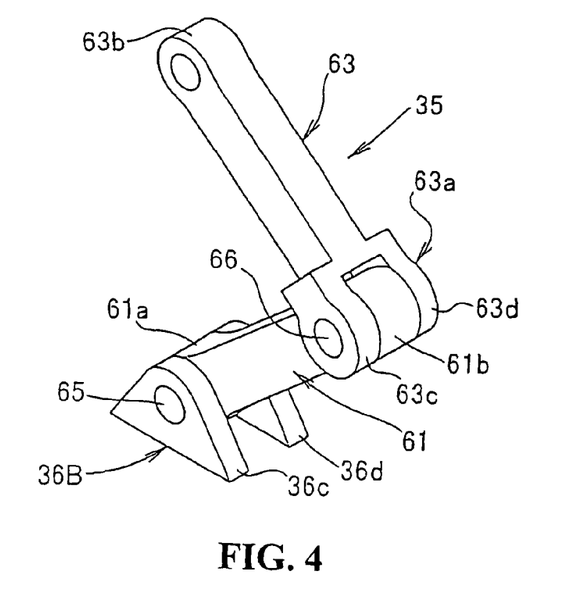
FIG. 4 is a perspective view for explaining the rolling support link mechanism according to the present invention (first embodiment)

FIG. 4 is a perspective view for explaining the rolling support link mechanism according to the present invention (first embodiment), wherein the first support link 61 of the rolling support link mechanism 35 is formed from one rod member. The first support link 61 includes a swing-arm-side connection portion 61a that is connected with the upper second bracket 36B on one end portion thereof and a second link-side connection portion 61B that is connected to the second support link 63 on another end portion.

The second support link 63 is formed of a fork-like member, and includes a first link-side connection portion 63a that is connected to the first support link 61 on one end portion thereof and a frame-side connection portion 63b that is connected to the frame-side bracket 62 (see FIG. 3) on another end portion thereof.

The first link-side connection portion 63a of the second support link 63 is a U-shaped portion that includes a pair of sandwiching portions 63c, 63d, which sandwich the second link-side connection portion 61b of the first support link 61.

Figure 5:
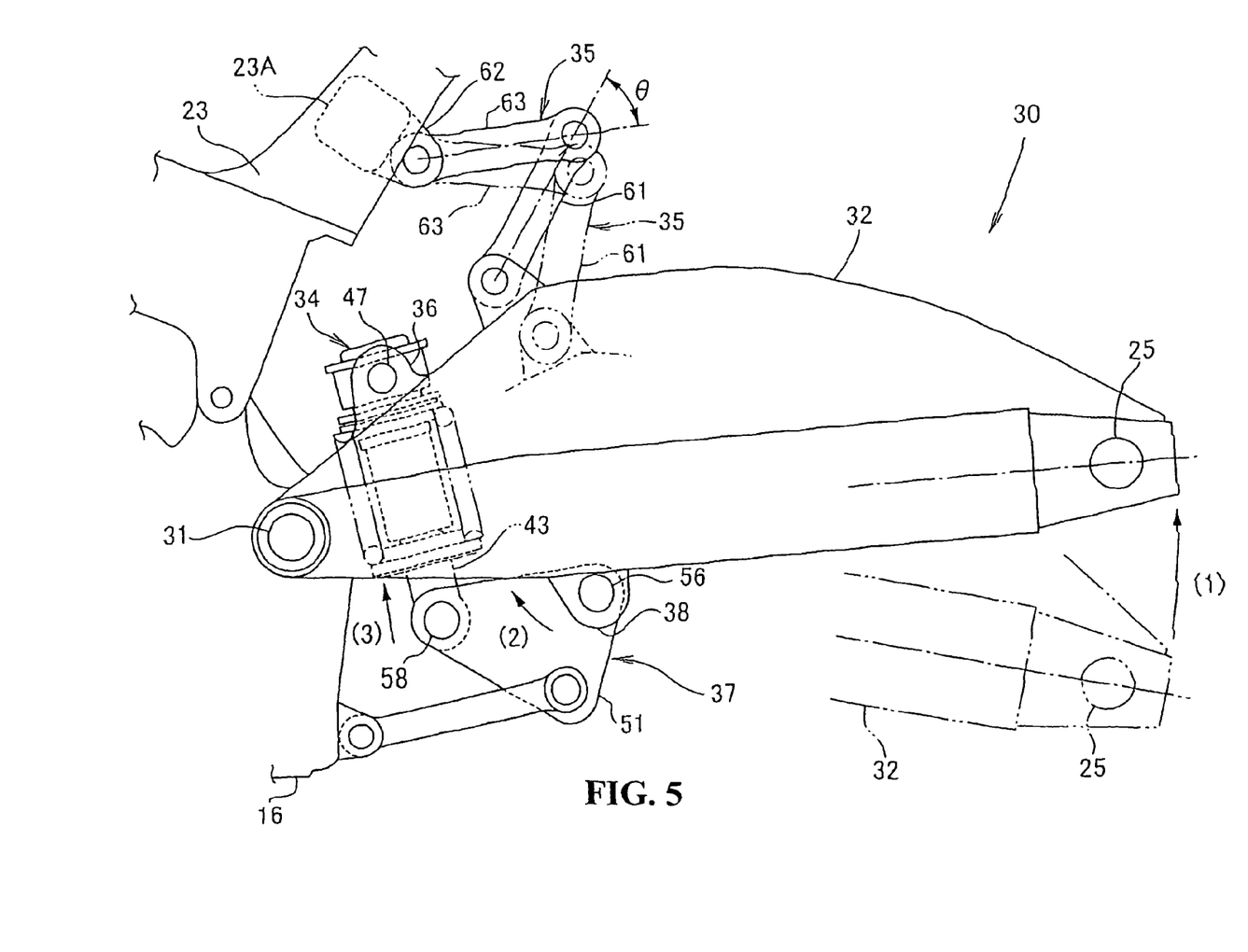
FIG. 5 is a first operational view for explaining the manner of operation of the swing-arm-type suspension device according to the present invention (first embodiment)

The manner of operation of the swing-arm-type suspension device described above will now be explained. FIG. 5 is a first operational view for explaining the manner of operation of the swing-arm-type suspension device according to the present invention (first embodiment).

In FIG. 1, for example, when the motorcycle 10 drives over a convex portion of a road surface, the rear wheel 33 is moved upwardly with respect to the vehicle body side (the main frame 11 and the power unit 16 provided on the vehicle body frame 28). In view of this, as shown in FIG. 5, the swing arm 32 is swung upwardly as indicated by an arrow (1) about the pivot shaft 31 from a position indicated by an imaginary line to a position indicated by a solid line. Along with such swinging, the first link 51 is swung in the clockwise direction as indicated by an arrow (2) about the first shaft 56. Accordingly, the lower-end mounting portion 43 that is mounted on the third shaft 58 is lifted as indicated by an arrow (3). Accordingly, the cushion unit 34 generates a dampening force while being contracted so as to absorb an impact.

The first support link 61 and the second support link 63 in the rolling support link mechanism 35 are bent such that an angle made by the first support link 61 and the second support link 63 is gradually decreased along with the upward swinging of the swing arm 32.

Figure 6:
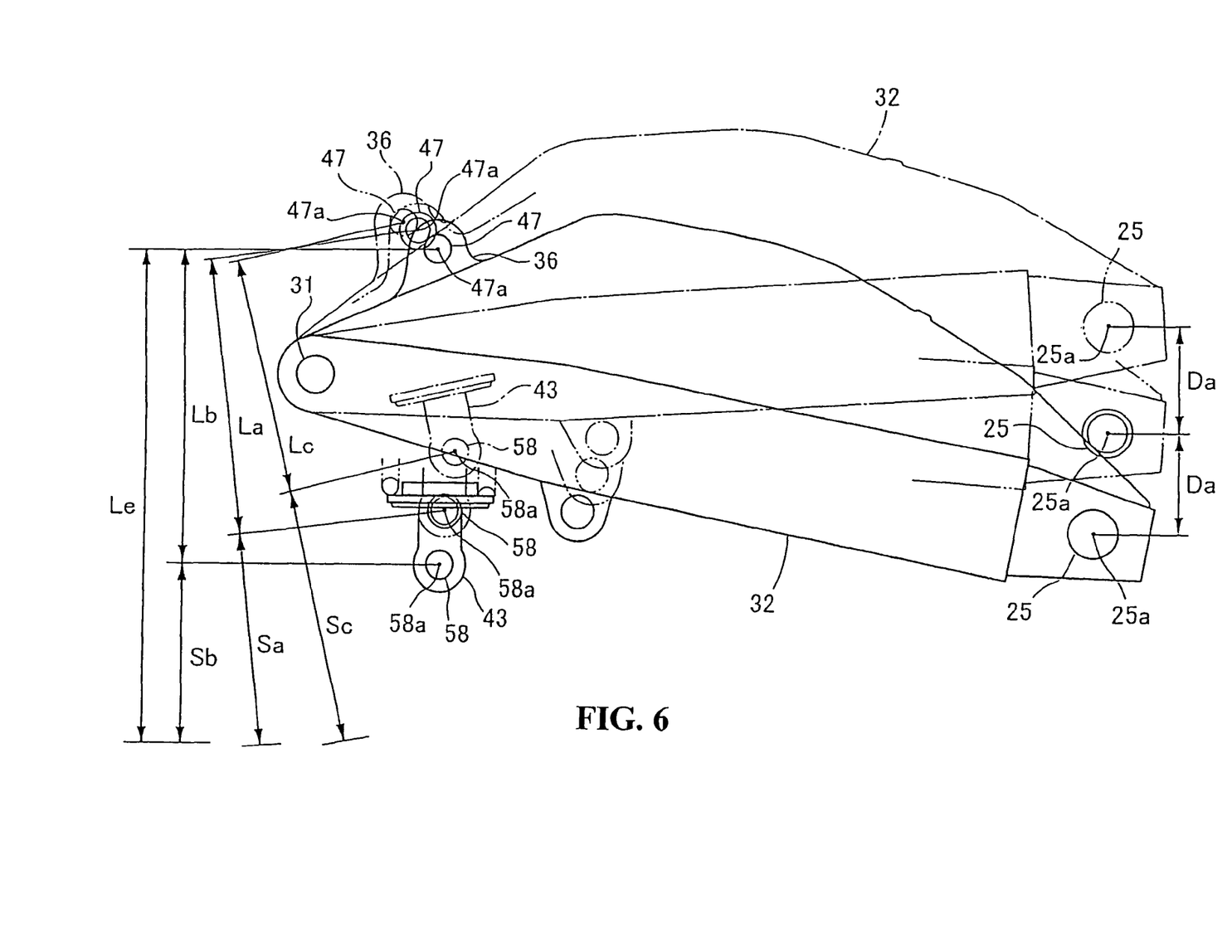
FIG. 6 is a second operational view for explaining the manner of operation of the swing-arm-type suspension device according to the present invention (first embodiment)

FIG. 6 is a second operational view for explaining the manner of operation of the swing-arm-type suspension device according to the present invention (first embodiment). FIG. 6 is also a view for explaining the relationship between a moving amount of the swing arm 32 in the vertical direction of the rear wheel axle 25 and a stroke amount of the cushion unit 34. In FIG. 6, a large double-circle mark identifies a rear wheel axle 25, and a small double-circle mark identifies the upper swing shaft 47 and the third shaft 58.

When the rear-wheel axle 25 assumes a position indicated by the double-circle mark, i.e., a position where a rear-wheel axle 25 assumes a state where a rider gets on the motorcycle and the motorcycle is stopped (without applying a force at the time of acceleration or deceleration to the vehicle body) and is erected (also referred to as "getting-on 1G state position", the position being referred to as "getting-on neutral position" hereinafter, the position also being getting-on neutral positions of the swing arm 32, the rear wheel 33 (see FIG. 1)), the third shaft 58 that constitutes a connection shaft of the cushion support link mechanism 37 (see FIG. 2) and the cushion unit 34 (see FIG. 2) assumes a position indicated by the double-circle mark.

Assuming a total length of the cushion unit 34 (a distance between an axis 47a of the upper swing shaft 47 and an axis 58a of the third shaft 58, being applicable to the description hereinafter in the same manner) at such a time as La and the total length at a time of extending the cushion unit 34 to a maximum stroke as Le, a stroke amount of the cushion unit 34 at the riding neutral position becomes Sa (i.e., Sa=Le−La).

When the swing arm 32 is swung (swung downwardly) toward an extending side of the cushion unit 34 (see FIG. 2) from the getting-on neutral position, the swing arm 32, the upper bracket 36 of the swing arm 32, the lower-end mounting portion 43 of the cushion unit 34, the third shaft 58 and the rear-wheel axle 25 assume the positions indicated by a solid line. At this position, a moving amount toward the extending side of the cushion unit 34 with respect to the rear-wheel axle 25 (a moving amount of the axis 25a of a rear-wheel axle 25) at this point of time is set as Da. The total length of the cushion unit 34 is set as Lb and the stroke amount is set as Sb (i.e., Sb=Le−Lb).

Furthermore, when the swing arm 32 is swung (swung upwardly) toward a contracting side of the cushion unit 34 from the getting-on neutral position, the swing arm 32, the upper bracket 36 of the swing arm 32, the lower-end mounting portion 43 of the cushion unit 34, the third shaft 58 and the rear-wheel axle 25 assume the positions indicated by a chained line. At this position, a moving amount toward the contracting side of the cushion unit 43 with respect to the rear-wheel axle 25 at this point of time is set as Da in the same manner as the above-mentioned moving amount. The total length of the cushion unit 34 is set as Lc and the stroke amount is set as Sc (i.e., Sc=Le−Lc).

In the swing-arm-type suspension device 30 of the present invention (see FIG. 2), with the use of the cushion support link mechanism 37 (see FIG. 2), the relationship (Sc−Sa)>(Sa−Sb) is established. Specifically, along with the movement of the rear-wheel axle 25 toward the contracting side of the cushion unit 34, a change of the stroke amount of the cushion unit 34 is increased. Accordingly, a moving speed of the piston of the cushion unit 34 is increased and hence, a dampening force generated by the cushion unit 34 is increased.

Figure 7:
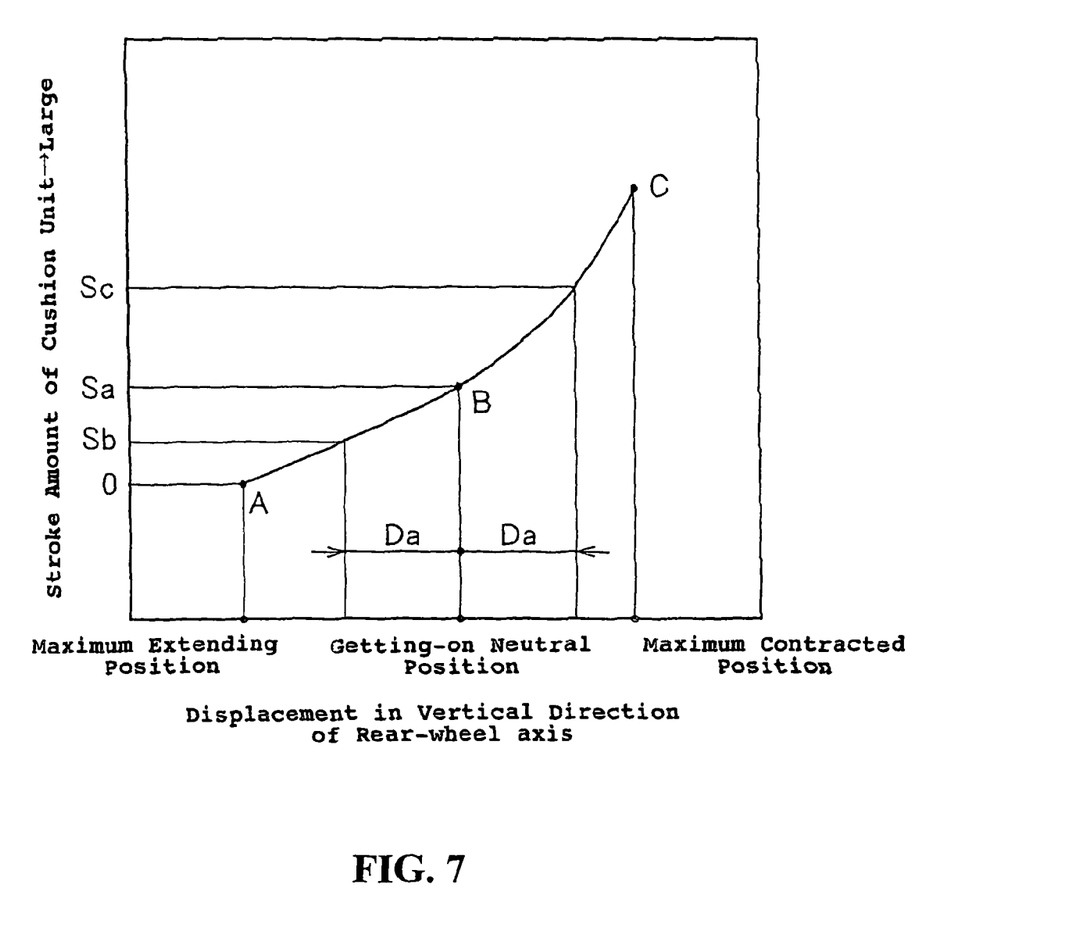
FIG. 7 is a graph showing the relationship between a displacement of a rear-wheel axle and a stroke amount of a cushion unit in the swing-arm-type suspension device according to the present invention (first embodiment)

FIG. 7 is a graph showing the relationship between a displacement of the rear-wheel axle and a stroke amount of the cushion unit in the swing-arm-type suspension device according to the present invention (first embodiment). The stroke amount of the cushion unit is taken on the ordinate axis and the displacement in the vertical direction of the rear-wheel axle is taken on the abscissa (see FIG. 2 and FIG. 5 with respect to the symbols).

A long as the displacement in the vertical direction of the rear-wheel axle 25 falls within a range from a point A which indicates a maximum extending position of the cushion unit 34 to a point B which indicates the getting-on neutral position, the stroke amount of the cushion unit 34 is increased substantially in a straight line along the increase of the displacement in the vertical direction of the rear-wheel axle 25.

Furthermore, as long as the displacement in the vertical direction of the rear-wheel axle 25 falls within a range from the point B of the getting-on neutral position to a point C which indicates a maximum contracted position of the cushion unit 34, a rate of the increase of the stroke amount of the cushion unit 34 with respect to the increase of the displacement in the vertical direction of the rear-wheel axle 25 is gradually increased.

In this manner, when the rear-wheel axle 25 is displaced toward the contracting side of the cushion unit 34 from the getting-on neutral position, the stroke amount of the cushion unit 34 is gradually increased by the cushion support link mechanism 37. Specifically, by increasing a stroke speed of the cushion unit 34, in the vicinity of the maximum contracted position of the cushion unit 34, the dampening force that is generated by the cushion unit 34 is increased. This prevents the bottom contacting of the cushion unit 34. Therefore, while in the vicinity of the getting-on neutral position, the dampening force generated by the cushion unit 34 is decreased thus improving riding comfort.

Figure 8:
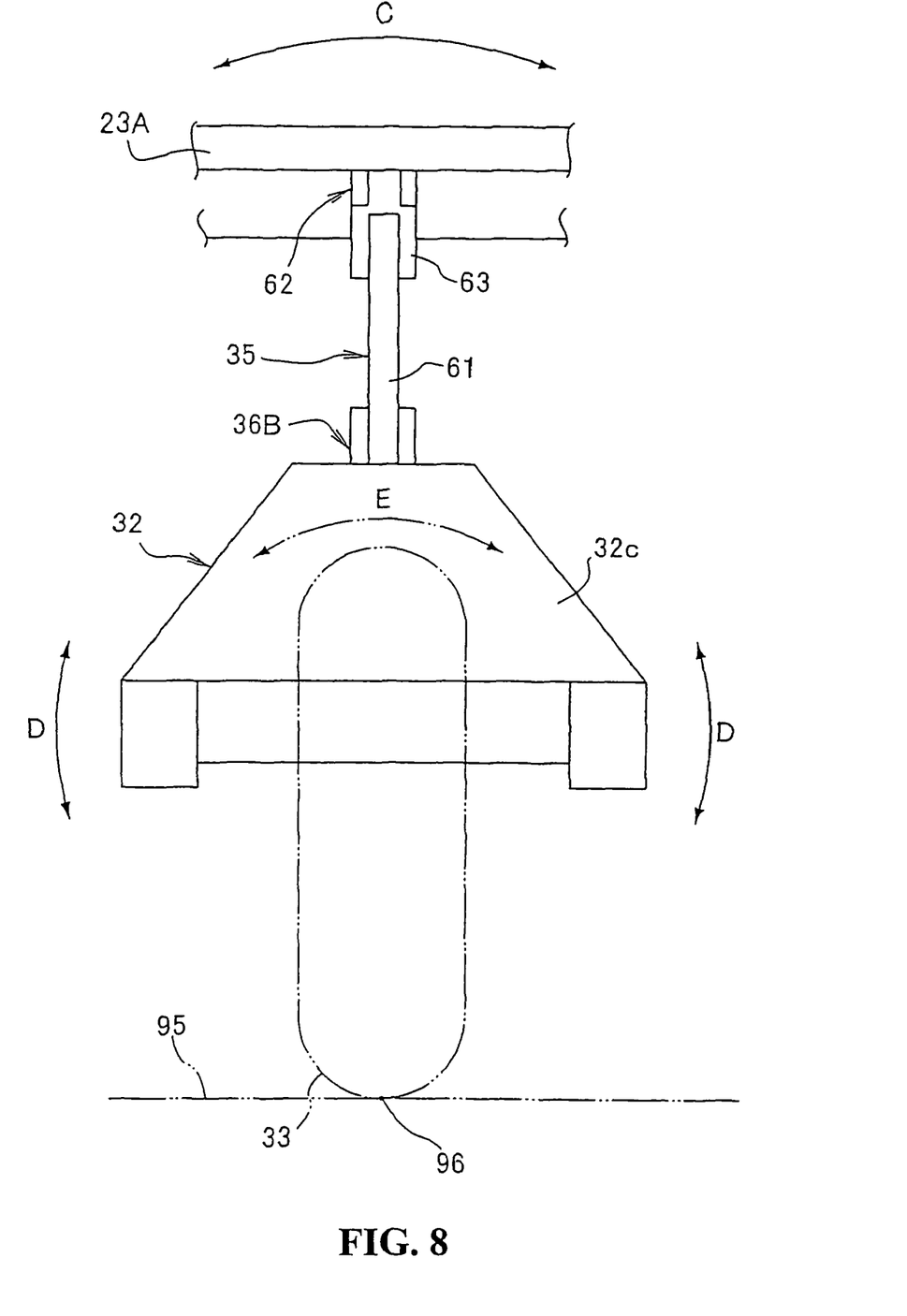
FIG. 8 is an operational view showing the manner of operation of the rolling support link mechanism according to the present invention (first embodiment)

The manner of operation of the rolling support link mechanism 35 described above will now be explained. FIG. 8 is an operational view showing the manner of operation of rolling support link mechanism according to the present invention (first embodiment).

When the vehicle body side (to be more specific, the vehicle body frame including the cross pipe 23A) rolls in the lateral direction of the vehicle as indicated by an arrow C, the rolling is transmitted to the rear wheel 33 by way of the power unit 16, the pivot shaft 31 and the swing arm 32 shown in FIG. 1.

According to the present invention, in addition to the above-mentioned rolling transmission path, as shown in FIG. 8, the rolling on the vehicle body frame side is transmitted to the swing arm 32 from the cross pipe 23A by way of the rolling support link mechanism 35 (arrows D, D indicating the rolling direction). The rear wheel 33 rolls as indicated by an arrow E and is tilted with respect to a ground 95 about a ground contacting point 96.

As shown in FIG. 5, even when the swing arm 32 is swung vertically, the rolling support link mechanism 35 is bent without resistance along with the swinging of the swing arm 32.

As has been explained heretofore in conjunction with FIG. 1 and FIG. 2, an embodiment of the present invention is directed to the swing-arm-type suspension device 30 for a motorcycle 10, which constitutes the vehicle in which the swing arm 32 is swingably mounted on the vehicle-body-frame-28 side. To be more specific, the pivot shaft 31 is formed on the power unit 16. One end of the cushion unit 34 is mounted on the swing arm 32. Another end of the cushion unit 34 is connected to the swing arm 32 and the vehicle body frame 28 side, i.e., the power unit 16 by way of the cushion support link mechanism 37. The rear wheel 33 is supported on the end portion of the swing arm 32, between the vehicle body frame 28. Specifically, the cross pipe 23A extends between the left and right seat rails 23, 23 and the swing arm 32. The rolling support link mechanism 35 transmits rolling in the lateral direction of the vehicle body about the ground contact point 96 (see FIG. 8), as the ground contact portions of the front wheel 14 and the rear wheel 33, to the swing arm 32 from the vehicle body frame 28.

The rolling support link mechanism 35 is provided between the cross pipe 23A and the swing arm 32. Therefore, in addition to the transmission of rolling of the vehicle body to the swing arm 32 from the vehicle body frame 28 side by way of the pivot shaft 31, it is possible to transmit rolling of the vehicle body to the swing arm 32 from the vehicle body frame 28 side by way of the rolling support link mechanism 35. In view of this, the transmission of rolling to the rear wheel 33 can be speedily performed by the rolling support link mechanism 35.

According to another aspect of the present invention, one end of the rolling support link mechanism 35 is connected to the upper portion of the swing arm 32. Therefore, the respective lengths of the respective links, i.e., the lengths of the first support link 61 and the second support link 63 of the rolling support link mechanism 35, can be made shorter. It is therefore possible to transmit rolling of the vehicle body frame 28 side to the rear wheel 33 more quickly.

According to a further aspect of the present invention, the swing-arm-32-side connection portion of the rolling support link mechanism 35 is arranged behind the cushion unit 34. Specifically, the upper second bracket 36B that supports one end of the rolling support link mechanism 35 is arranged behind the upper first bracket 36A of the swing arm 32 that supports one end of the cushion unit 34. Therefore, the swing-arm-32-side connection portion of the rolling support link mechanism 35 is arranged close to the rear wheel 33. In view of this, it is possible to efficiently transmit rolling of the vehicle body frame 28 side to the rear wheel 33 thus enhancing the rolling responsiveness of the rear wheel 33 with respect to the rolling on the vehicle body frame 28 side.

Figure 9:
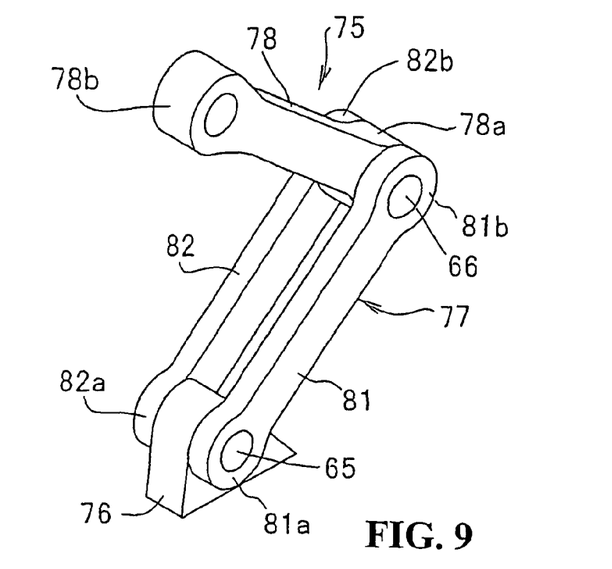
FIG. 9 is a perspective view showing the rolling support link mechanism according to the present invention (second embodiment)

FIG. 9 is a perspective view showing the rolling support link mechanism according to the present invention (second embodiment). The rolling support link mechanism 75 includes a first support link 77 that has one end thereof swingably mounted on an upper second bracket 76, which is formed on an upper portion of the swing arm 32 (see FIG. 5). A second support link 78 that has one end thereof swingably mounted on another end of the first support link 77 and another end thereof swingably mounted on the frame-side bracket 62 (see FIG. 5) on the seat rail 23 (see FIG. 5) side.

The first support link 77 is formed of a left link 81 and a right link 82, which constitute a pair of rod members. The left and right links 81, 82 respectively form swing-arm-side connection portions 81a, 82a that are connected to the upper second bracket 76 on one end portion thereof. The left and right links 81, 82 also respectively form second-link-side connection portions 81b, 82b connected to the second support link 78 on opposite ends thereof.

The second support link 78 includes one rod member. The second support link 78 forms a first-link-side connection portion 78a that is connected to the first support link 77 on one end portion thereof and a frame-side connection portion 78b that is connected to the frame-side bracket 62 on another end portion thereof.

Figure 10:
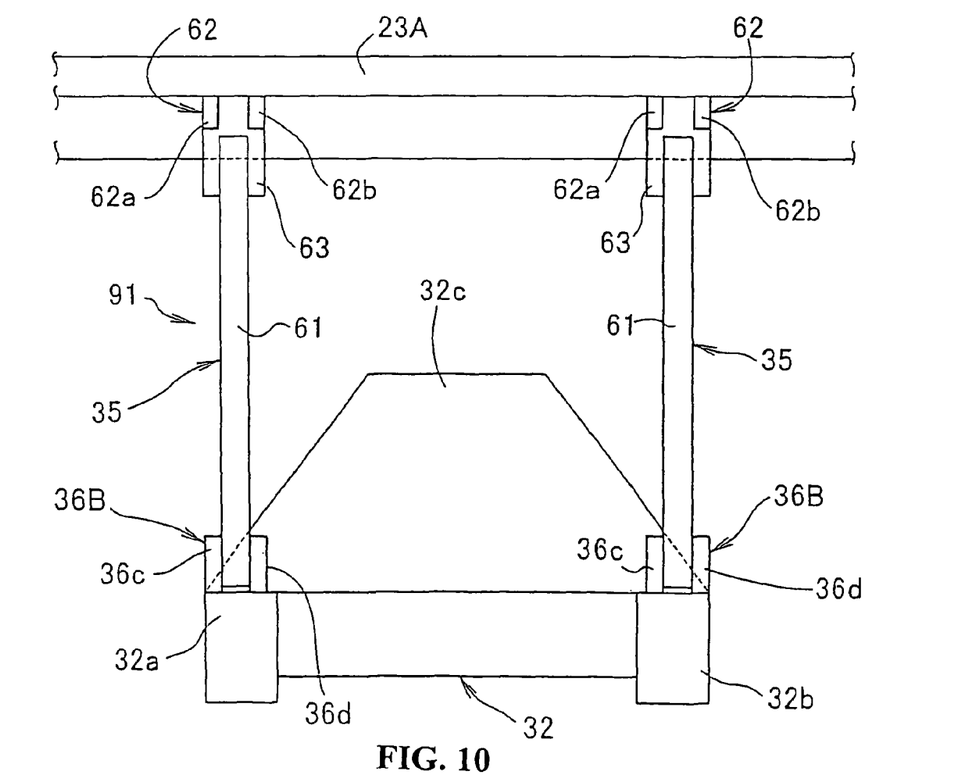
FIG. 10 is a back view showing the rolling support link mechanism according to the present invention (third embodiment).

FIG. 10 is a back view showing the rolling support link mechanism according to the present invention (third embodiment). The rolling support link mechanism 91 includes a pair of rolling support link mechanisms 35 that have first ends thereof respectively connected to an upper portion of the left section 32a and an upper portion of that right section 32b of the swing arm 32. Second ends of the rolling support link mechanisms 35 are connected to the frame-side brackets 62, 62 formed on the left and right portions of the cross pipe 23A.

In this manner, by providing the pair of left and right rolling support link mechanisms 35, it is possible to efficiently transmit the rolling of the vehicle body frame side to the swing arm 32. Therefore, it is possible to further enhance the rolling responsiveness of the rear wheel 33 (see FIG. 8).

Furthermore, in this embodiment, as shown in FIG. 2, one end of the rolling support link mechanism 35 is mounted on the cross pipe 23A of the seat rail 23. However, the present invention is not limited to such a constitution. For example, one end of the rolling support link mechanism 35 can be mounted on the main frame 11 side (directly mounted on the main frame 11 or mounted on the cross pipe that extends between the left and right main frames). In addition, one end of the rolling support link mechanism 35 can be mounted on the sub frame 24 side (directly mounted on the sub frame 24 or mounted on the cross pipe that extends between the left and right sub frames 24).

The swing-arm-type suspension device of the present invention is suitable for a two-wheeled vehicle that supports at least one of a front wheel and a rear wheel using a swing arm.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A swing-arm-type suspension device for a vehicle, comprising:
    a vehicle body frame, said vehicle body frame including a main frame and a seat rail which extends obliquely rearwardly and upwardly from a rear portion of the main frame;
    a swing arm, said swing arm being swingably mounted on a pivot shaft provided on a vehicle body frame side thereof;
    a cushion unit, one end of the cushion unit being pivotally mounted to the swing arm, another end of the cushion unit being mounted on the swing arm and the vehicle body frame via a cushion support link mechanism;
    a rear wheel, said rear wheel being supported on an end portion of the swing arm; and
    a rolling support link mechanism that transmits rolling in the lateral direction of the vehicle about ground contacting portions of a front wheel and the rear wheel to the swing arm from the vehicle body frame, said rolling support link mechanism,
    wherein said rolling support link mechanism includes a first support link pivotally mounted to the swing arm at a first end thereof and a second support link pivotally mounted at a first end thereof to a second end of the first support link, a second end of said second support link being pivotally mounted to the seat rail, the mounting portion of the second end of the second support link and the seat rail being above said one end of the cushion unit, said rolling support link mechanism further including an upper bracket formed on an upper portion of a connection portion connecting a left section and a right section of the swing arm, the first support link pivotally mounted to the upper portion.

2. The swing-arm-type suspension device for a vehicle according to claim 1, wherein the rolling support link mechanism has one end thereof connected to an upper portion of the swing arm.

3. The swing-arm-type suspension device for a vehicle according to claim 1, wherein the rolling support link mechanism has a swing-arm-side connecting portion thereof arranged behind the cushion unit.

4. The swing-arm-type suspension device for a vehicle according to claim 2, wherein the rolling support link mechanism has a swing-arm-side connecting portion thereof arranged behind the cushion unit.

5. The swing arm-type suspension device for a vehicle according to claim 1, wherein there are two of said first support link, each of the two first support links being mounted between the swing arm and the second support link.

6. The swing arm-type suspension device for a vehicle according to claim 1, wherein the vehicle body frame includes a main frame and the seat rail, said seat rail including a cross pipe extending laterally of the vehicle, and said rolling support link mechanism is mounted to said cross pipe.

7. The swing arm-type suspension device for a vehicle according to claim 1, wherein there is one rolling support link mechanism mounted to a central portion of the swing arm.

8. The swing arm-type suspension device for a vehicle according to claim 1, wherein there are two of said rolling support link mechanisms mounted between the body frame and left and right arms of the swing arm, respectively.

9. A vehicle, comprising:
    a vehicle body frame, said vehicle body frame including a main frame and a seat rail which extends obliquely rearwardly and upwardly from a rear portion of the main frame;
    an engine mounted to the vehicle body frame;
    a swing arm, said swing arm being swingably mounted on a pivot shaft provided on the engine, the swing arm having a left section and a right section connected by a connection portion;
    a cushion unit, one end of the cushion unit being pivotally mounted to the swing arm, another end of the cushion unit being mounted on the swing arm and the engine via a cushion support link mechanism;
    a front wheel, said front wheel being turnably mounted on body frame;
    a rear wheel, said rear wheel being supported on an end portion of the swing arm; and
    a rolling support link mechanism that transmits rolling in the lateral direction of the vehicle to the swing arm from the vehicle body frame, wherein said rolling support link mechanism includes a first support link pivotally mounted to the swing arm at a first end thereof and a second support link pivotally mounted at a first end thereof to a second end of the first support link, a second end of said second support link being pivotally mounted to the seat rail, the mounting portion of the second end of the second support link being above said one end of the cushion unit.

10. The vehicle according to claim 9, wherein the rolling support link mechanism has one end thereof connected to an upper portion of the swing arm.

11. The vehicle according to claim 9, wherein the rolling support link mechanism has a swing-arm-side connecting portion thereof arranged behind the cushion unit.

12. The vehicle according to claim 10, wherein the rolling support link mechanism has a swing-arm-side connecting portion thereof arranged behind the cushion unit.

13. The vehicle according to claim 9, wherein there are two of said first support link, each of the two first support links being mounted between the swing arm and the second support link.

14. The vehicle according to claim 9, wherein the seat rail includes a cross pipe extending laterally of the vehicle, and said rolling support link mechanism is mounted to said cross pipe.

15. The vehicle according to claim 9, wherein there is one rolling support link mechanism mounted to a central portion of the swing arm.

16. The vehicle according to claim 9, wherein there are two of said rolling support link mechanisms mounted between the seat rail and left and right arms of the swing arm, respectively.

17. The swing arm-type suspension device for a vehicle according to claim 1, wherein the cushion support link mechanism comprises a triangular link, one corner of the triangular link attached to the swing arm, a second corner attached to the cushion unit and a third corner attached to the vehicle frame by a linkage.

18. The vehicle according to claim 9, wherein the cushion support link mechanism comprises a triangular link, one corner of the triangular link attached to the swing arm, a second corner attached to the cushion unit and a third corner attached to the vehicle frame by a linkage.

* * * * *